US011987351B2

(12) United States Patent
Peters et al.

(10) Patent No.: US 11,987,351 B2
(45) Date of Patent: May 21, 2024

(54) TOW LINE TENSION MANAGEMENT SYSTEMS FOR AIRCRAFT

(71) Applicant: Textron Innovations Inc., Providence, RI (US)

(72) Inventors: Russell C. Peters, Fort Worth, TX (US); John Robert Wittmaak, Jr., Newark, TX (US); Alyssa Berta Armendariz, Fort Worth, TX (US); Christopher John Stroncek, Kennedale, TX (US)

(73) Assignee: Textron Innovations Inc., Providence, RI (US)

( * ) Notice: Subject to any disclaimer, the term of this patent is extended or adjusted under 35 U.S.C. 154(b) by 149 days.

(21) Appl. No.: 17/885,053

(22) Filed: Aug. 10, 2022

(65) Prior Publication Data

US 2024/0051661 A1    Feb. 15, 2024

(51) Int. Cl.
| | | |
|---|---|---|
| B64C 29/00 | (2006.01) | |
| B64C 29/02 | (2006.01) | |
| B64D 1/22 | (2006.01) | |
| B64D 3/00 | (2006.01) | |
| B64U 10/14 | (2023.01) | |
| B64U 10/20 | (2023.01) | |
| B64U 10/60 | (2023.01) | |

(52) U.S. Cl.
CPC .......... *B64C 29/0091* (2013.01); *B64C 29/02* (2013.01); *B64D 1/22* (2013.01); *B64D 3/00* (2013.01); *B64U 10/14* (2023.01); *B64U 10/20* (2023.01); *B64U 10/60* (2023.01)

(58) Field of Classification Search
CPC . B64D 3/00; B64D 1/22; B64U 10/14; B64U 10/60; B64C 29/02; B64C 29/0091
See application file for complete search history.

(56) References Cited

U.S. PATENT DOCUMENTS

| | | | |
|---|---|---|---|
| 3,149,803 A * | 9/1964 | Petrides | ................ B64C 39/022 244/17.23 |
| 8,646,719 B2 | 2/2014 | Morris et al. | |
| 9,446,858 B2 | 9/2016 | Hess | |
| 9,786,105 B2 | 10/2017 | Moloney et al. | |
| 9,926,084 B2 | 3/2018 | Peverill et al. | |
| 10,007,272 B2 | 6/2018 | Tirpak et al. | |
| 10,099,782 B2 | 10/2018 | Hundemer | |

(Continued)

*Primary Examiner* — Richard G Davis
(74) *Attorney, Agent, or Firm* — Lawrence Youst PLLC

(57) ABSTRACT

A tailsitter aircraft for deploying a tow line includes an airframe having wings with pylons extending therebetween and a thrust array attached to the airframe, the thrust array including propulsion assemblies configured to transition the airframe between a forward flight orientation and a VTOL orientation. The tailsitter aircraft includes an attenuation spool coupled to the airframe and an attenuation cable having a first end coupled to the attenuation spool and a second end coupled to the tow line, the attenuation cable partially or fully wound around the attenuation spool. The tailsitter aircraft also includes a spool sensor to detect movement of the attenuation spool and a flight control system implementing a tow line tension monitoring module in communication with the spool sensor to determine a tow line tension parameter and a tow line tension reaction module to initiate an aircraft response based on the tow line tension parameter.

12 Claims, 13 Drawing Sheets

(56) References Cited

U.S. PATENT DOCUMENTS

| | | |
|---|---|---|
| 10,384,777 B1 | 8/2019 | Welsh |
| 11,273,911 B2 | 3/2022 | Brand et al. |
| 2010/0308174 A1 | 12/2010 | Calverley |
| 2013/0233964 A1 | 9/2013 | Woodworth et al. |
| 2015/0041598 A1 | 2/2015 | Nugent et al. |
| 2015/0054282 A1 | 2/2015 | Goldstein |
| 2015/0102154 A1 | 4/2015 | Duncan et al. |
| 2015/0180186 A1 | 6/2015 | Lind et al. |
| 2016/0083115 A1 | 3/2016 | Hess |
| 2016/0200437 A1 | 7/2016 | Ryan et al. |
| 2016/0318607 A1 | 11/2016 | Desai et al. |
| 2017/0021944 A1 | 1/2017 | Peverill et al. |
| 2017/0029105 A1 | 2/2017 | Ferren et al. |
| 2017/0113816 A1 | 4/2017 | High et al. |
| 2017/0144754 A1 | 5/2017 | Limvorapun et al. |
| 2017/0158354 A1 | 6/2017 | Bourne et al. |
| 2017/0355460 A1 | 12/2017 | Shannon et al. |
| 2017/0363066 A1 | 12/2017 | Hart et al. |
| 2018/0050798 A1 | 2/2018 | Kapuria |
| 2018/0244384 A1 | 8/2018 | Phan et al. |
| 2019/0285055 A1 | 9/2019 | Flotow et al. |
| 2020/0207471 A1* | 7/2020 | Yasuda .................. B64C 27/08 |
| 2020/0225684 A1 | 7/2020 | Anderson et al. |
| 2020/0307399 A1 | 10/2020 | Lashbrook et al. |
| 2020/0307786 A1 | 10/2020 | Tavakolikhakaledi et al. |
| 2020/0314627 A1 | 10/2020 | Fischer |
| 2020/0369408 A1 | 11/2020 | Dolata et al. |
| 2020/0377210 A1 | 12/2020 | McRoberts et al. |
| 2020/0385115 A1 | 12/2020 | Piasecki et al. |
| 2021/0011492 A1 | 1/2021 | Raabe et al. |
| 2021/0292007 A1* | 9/2021 | Ng ........................... B64F 3/00 |

\* cited by examiner

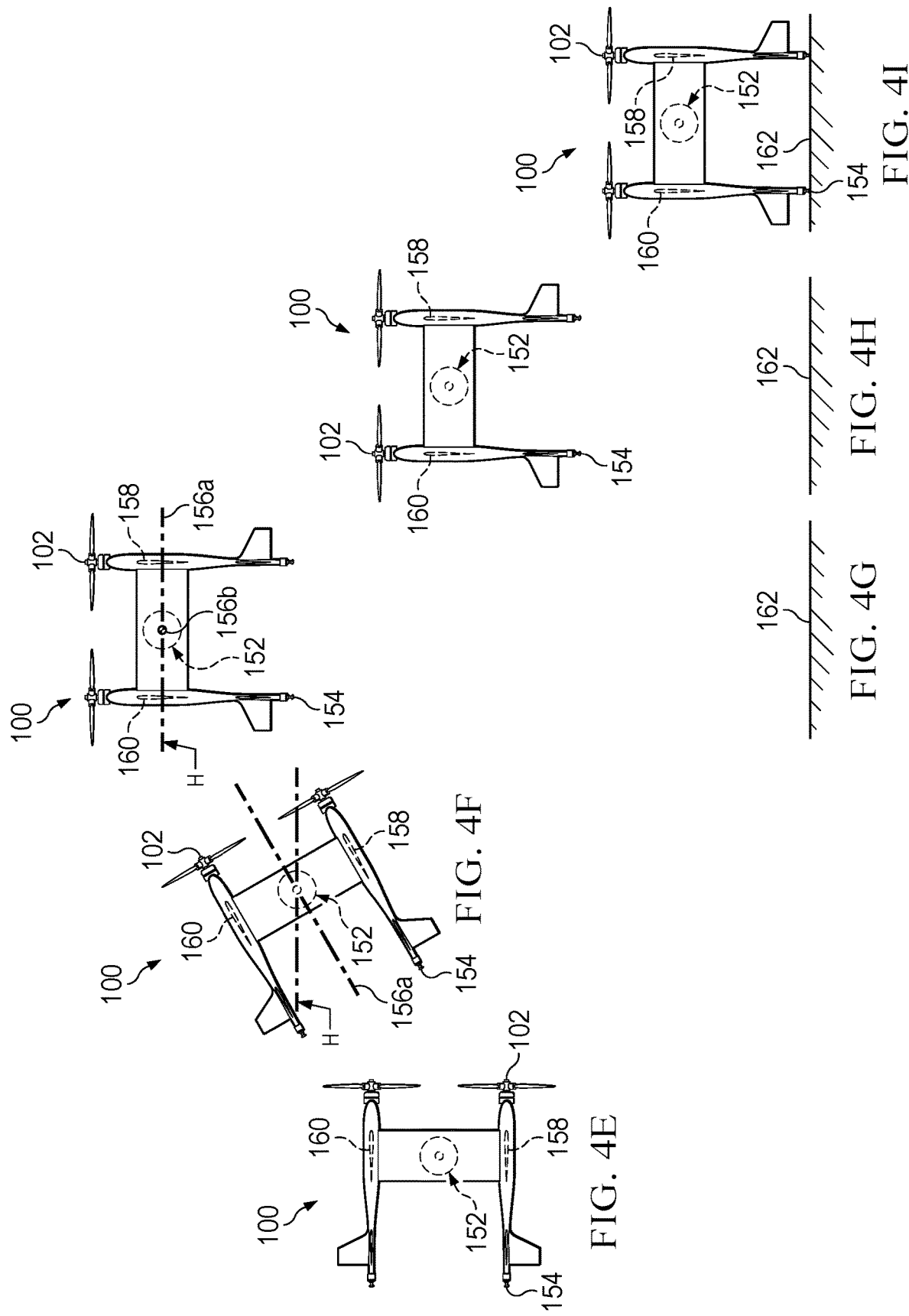

TOW LINE TENSION MANAGEMENT SYSTEMS FOR AIRCRAFT

TECHNICAL FIELD OF THE DISCLOSURE

The present disclosure relates, in general, to the use of aircraft to deploy tow lines to or from a vehicle such as a ship and, in particular, to tow line tension management systems for aircraft that monitor tow line tension and implement a suitable response when increases in tow line tension are encountered during flight, thereby preventing the tow line from endangering the aircraft.

BACKGROUND

Tow lines may be deployed to and from vehicles such as boats, ships, land vehicles and aircraft carriers for a variety of operational purposes. For example, tow lines may be deployed to a ship from a nearby shore so that a fuel conduit may be pulled to the ship, allowing the ship to be supplied with fuel. In a similar manner, tow lines may be used to pull water conduits to the ship to supply the ship with fresh water. Tow lines may also be deployed between water-borne vehicles to enable towing of disabled vehicles. Currently, small boats are used to deploy tow lines across bodies of water. It has been found, however, that small boats are vulnerable to turbulent waters such as large waves which may result in the tow line becoming tangled, either underwater or in the boat itself. In addition, it has been found that deploying a tow line by boat may be a difficult and dangerous process particularly when the tow line must be lowering onto a small boat from a larger ship.

Aircraft may be used to overcome the drawbacks of deploying a tow line by boat. When using aircraft to deploy tow lines, the tow line may be deployed from the shore to a water-borne vehicle, from a water-borne vehicle to the shore or between water-borne vehicles. In one example operational scenario, a spool of tow line may be located on the shore and one end of the tow line may be attached to the aircraft, which transports the tow line over a body of water to a water-borne vehicle. While dragging the tow line over a body of water, however, the tow line is susceptible to being caught on a variety of different snag or tangle hazards. Examples of snag hazards that the tow line may encounter include rock or land formations, boats, trees, high surface friction as well as objects either in the water or on the shore. The tow line may also become tangled on itself on the tow line spool. When a snag hazard is encountered, the sudden spike in tow line tension may cause the aircraft to crash. For certain types of aircraft, a sudden increase in tow line tension may cause the aircraft to dynamically roll over. Unmanned aircraft may be particularly susceptible to rolling over in such cases since unmanned aircraft often lack the inertial reference available to pilots on manned aircraft. Accordingly, a need has arisen for aircraft systems capable of monitoring tow line tension and implementing a suitable response when increases in tow line tension are encountered.

SUMMARY

In a first aspect, the present disclosure is directed to a tailsitter aircraft for deploying a tow line having a tow line tension. The tailsitter aircraft includes an airframe having first and second wings with first and second pylons extending therebetween and a thrust array attached to the airframe, the thrust array including propulsion assemblies configured to transition the airframe between a forward flight orientation having wing-borne lift and a VTOL orientation having thrust-borne lift. The tailsitter aircraft also includes an attenuation spool coupled to the airframe and an attenuation cable having a first end coupled to the attenuation spool and a second end coupled to the tow line, the attenuation cable partially or fully wound around the attenuation spool. The tailsitter aircraft also includes a spool sensor to detect movement of the attenuation spool and a flight control system implementing a tow line tension monitoring module in communication with the spool sensor to determine a tow line tension parameter and a tow line tension reaction module configured to initiate an aircraft response based on the tow line tension parameter.

In some embodiments, the attenuation spool may be rotatable in a deployment rotational direction to deploy the attenuation cable in response to an increase in the tow line tension, thereby attenuating a load on the airframe. In certain embodiments, the tailsitter aircraft may include a coil spring coupled to the attenuation spool, the coil spring biasing the attenuation spool in a retraction rotational direction to retract the attenuation cable in response to the coil spring biasing force exceeding the tow line tension. In some embodiments, the attenuation cable may include a mechanical fuse configured to detach the tow line from the airframe in response to the tow line tension exceeding a breakaway reaction threshold. In certain embodiments, the mechanical fuse may be configured to fracture in response to the tow line tension exceeding the breakaway reaction threshold. In some embodiments, the mechanical fuse may be a shear pin. In certain embodiments, the mechanical fuse may be an electrically-actuated mechanical fuse and the tow line tension reaction module may include a tow line breakaway command module configured to send a release command to the electrically-actuated mechanical fuse in response to the tow line tension parameter exceeding the breakaway reaction threshold, the electrically-actuated mechanical fuse releasing the tow line from the airframe in response to receiving the release command.

In some embodiments, the spool sensor may include a spool position sensor to detect a position of the attenuation spool. In certain embodiments, the spool sensor may include a roller engaged with the attenuation spool to detect rotational movement of the attenuation spool. In some embodiments, the tow line tension reaction module may include an aircraft speed command module to reduce a speed of the tailsitter aircraft in response to the tow line tension parameter exceeding a speed reaction threshold. In certain embodiments, the tow line tension reaction module may include an aircraft orientation command module to change a flight orientation of the tailsitter aircraft from the forward flight orientation to the VTOL orientation in response to the tow line tension parameter exceeding an orientation reaction threshold. In some embodiments, the tow line tension monitoring module may include a tow line tension rate of change monitoring module to determine a tow line tension rate of change and the tow line tension reaction module may be configured to initiate the aircraft response based on the tow line tension rate of change.

In a second aspect, the present disclosure is directed to an aircraft for deploying a tow line including a fuselage, a tow line spool mount coupled to the fuselage and a tow line spool rotatably coupled to the tow line spool mount, the tow line wound around the tow line spool. The aircraft also includes a spool sensor configured to detect movement of the tow line spool and a flight control system implementing a tow line tension monitoring module in communication with the spool sensor to determine a tow line tension parameter and a tow line tension reaction module configured to initiate an aircraft response based on the tow line tension parameter.

In some embodiments, the tow line spool mount may include the spool sensor and the spool sensor may include a linear spring. In certain embodiments, the tow line spool mount may include a mechanical fuse configured to fracture in response to the tow line tension parameter exceeding a breakaway reaction threshold, thereby detaching the tow line spool from the fuselage.

In a third aspect, the present disclosure is directed to a method for managing tow line tension for a tow line coupled to an aircraft including connecting the tow line to a tow line interface assembly coupled to the aircraft, flying the aircraft to transport the tow line toward a destination, monitoring a tow line tension parameter while flying the aircraft and initiating an aircraft response in response to the tow line tension parameter.

In some embodiments, the tow line interface assembly may include an attenuation cable coupled to the tow line and the method may include extending the attenuation cable in response to an increase in the tow line tension parameter. In certain embodiments, initiating the aircraft response in response to the tow line tension parameter may include reducing a speed of the aircraft in response to the tow line tension parameter exceeding a speed reaction threshold. In some embodiments, initiating the aircraft response in response to the tow line tension parameter may include changing a flight orientation of the aircraft from a forward flight orientation to a VTOL orientation in response to the tow line tension parameter exceeding an orientation reaction threshold. In certain embodiments, initiating the aircraft response in response to the tow line tension parameter may include detaching the tow line from the aircraft in response to the tow line tension parameter exceeding a breakaway reaction threshold.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4I are schematic illustrations of an aircraft with a tow line tension management system in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
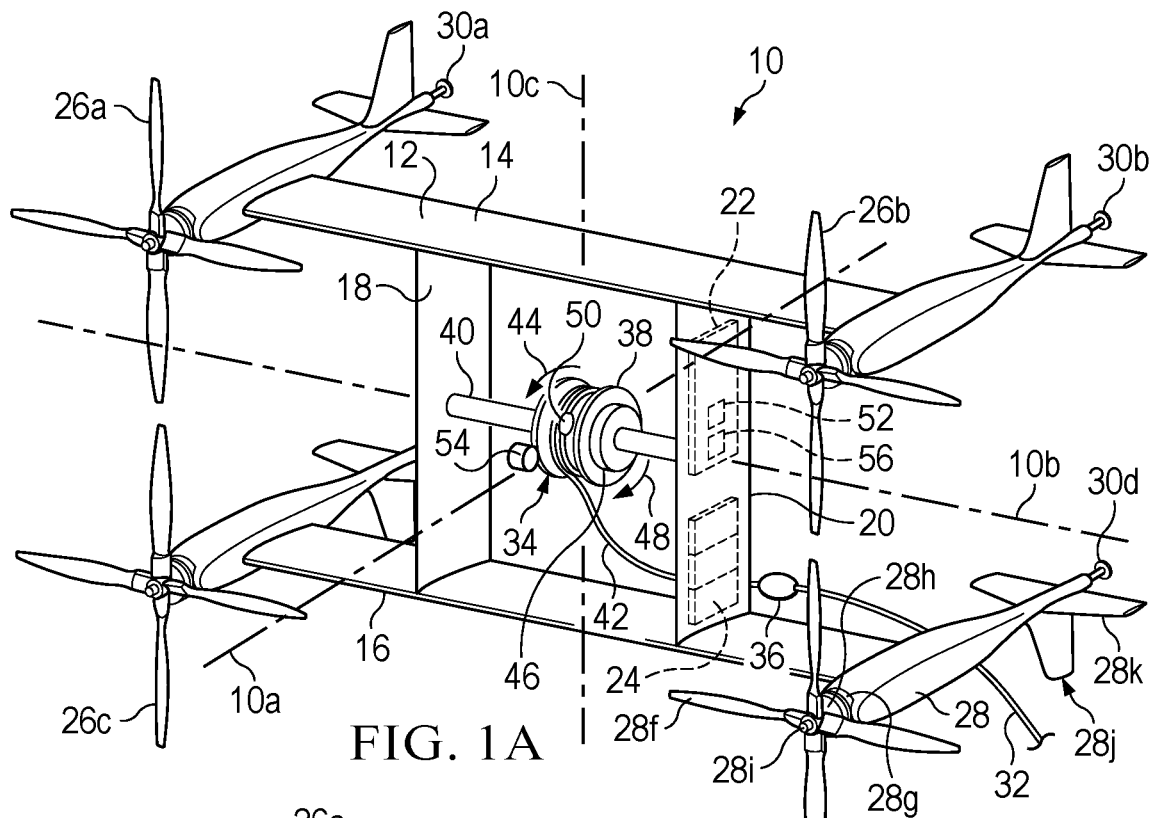
FIGS. 1A-1B are schematic illustrations of an aircraft including a tow line tension management system that is operable to convert between thrust-borne lift in a VTOL orientation and wing-borne lift in a forward flight orientation in accordance with embodiments of the present disclosure.
Figure 1B:
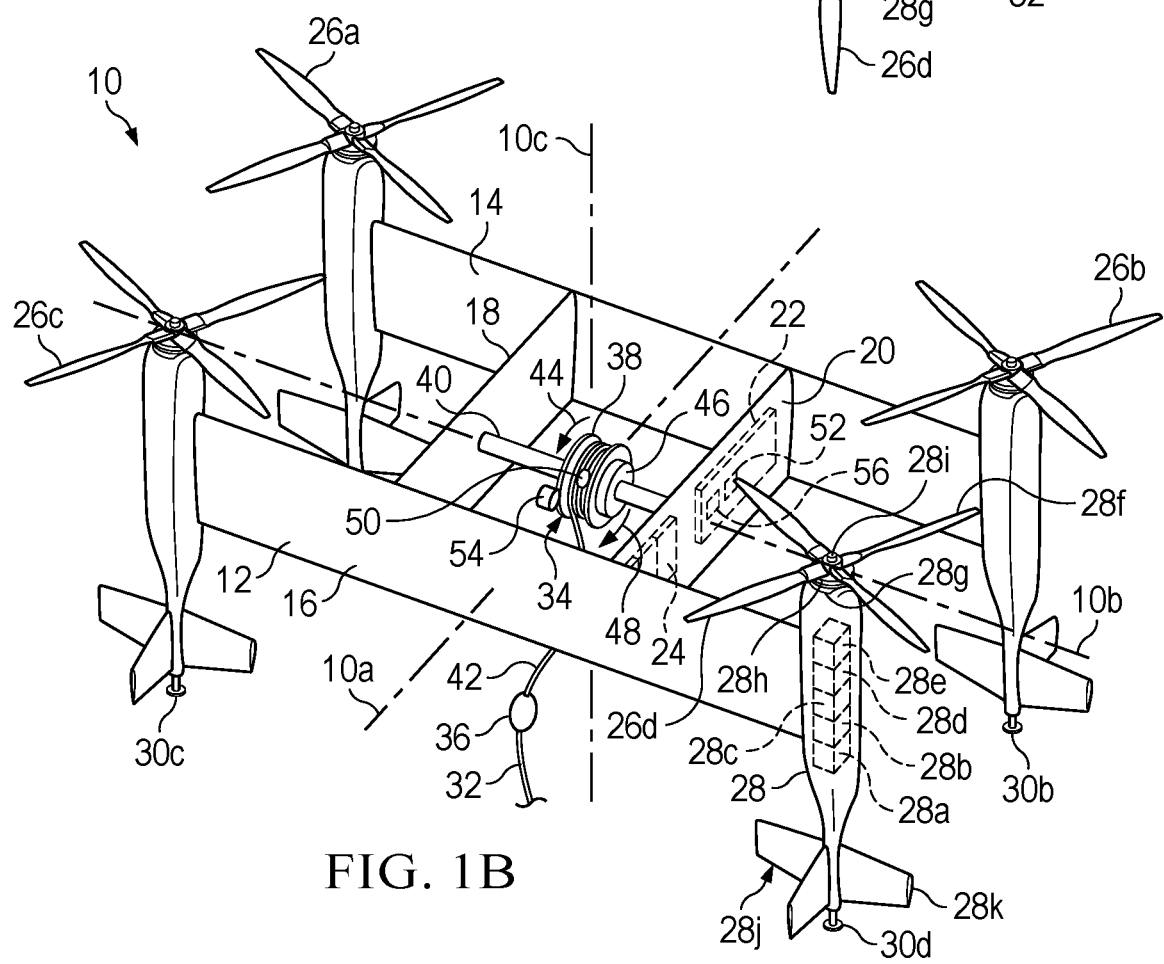

Referring to FIGS. 1A-1B in the drawings, isometric views of a tailsitter aircraft 10 with a tow line tension management system that is operable to transition between thrust-borne lift in a VTOL orientation and wing-borne lift in a forward flight or biplane orientation are depicted. FIG. 1A depicts aircraft 10 in the forward flight orientation wherein the propulsion assemblies provide forward thrust with the forward airspeed of aircraft 10 providing wing-borne lift enabling aircraft 10 to have a high speed and/or high endurance forward flight mode. FIG. 1B depicts aircraft 10 in the VTOL orientation wherein the propulsion assemblies provide thrust-borne lift. Aircraft 10 has a longitudinal axis 10*a* that may also be referred to as the roll axis, a lateral axis 10*b* that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1B. Both the magnitudes of the length and the width of aircraft 10 as well as the difference between the length and the width of aircraft 10 are important relative to the landing stability of aircraft 10 and the tip-over stability of aircraft 10 when aircraft 10 is positioned on a surface such as the ground in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the forward flight orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

One or more of wings 14, 16 and/or pylons 18, 20 may contain flight control systems, energy sources, communication lines and other desired systems. For example, pylon 20 houses flight control system 22 of aircraft 10. Flight control system 22 is preferably a redundant digital flight control system including multiple independent flight control computers. For example, the use of a triply redundant flight control system 22 improves the overall safety and reliability of aircraft 10 in the event of a failure in flight control system 22. Flight control system 22 preferably includes non-transitory computer readable storage media including a set of computer instructions executable by one or more processors for controlling the operation of aircraft 10. Flight control system 22 may be implemented on one or more general-purpose computers, special purpose computers or other machines with memory and processing capability. For example, flight control system 22 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 22 may be a microprocessor-based system operable to execute program code in the form of machine-executable instructions. In addition, flight control system 22 may be selectively connectable to other computer systems via a proprietary encrypted network, a public encrypted network, the Internet or other suitable communication network that may include both wired and wireless connections.

One or more of wings 14, 16 and/or pylons 18, 20 may contain one or more electrical power sources depicted as a plurality of batteries 24 in pylon 20. Batteries 24 supply electrical power to flight control system 22, the distributed thrust array of aircraft 10 and/or other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 24. In other embodiments, the electric generator may provide power directly to a power management system and/or the power consumers of aircraft 10. In still other embodiments, aircraft 10 may use fuel cells as the electrical power source.

Wings 14, 16 and/or pylons 18, 20 also contain a wired and/or wireless communication network that enables flight control system 22 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 26a, 26b, 26c, 26d and collectively referred to as propulsion assemblies 26. In the illustrated embodiment, propulsion assemblies 26a, 26b are coupled at the wingtips of wing 14 and propulsion assemblies 26c, 26d are coupled at the wingtips of wing 16. By positioning propulsion assemblies 26a, 26b, 26c, 26d at the wingtips of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 26 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 26 relative to other propulsion assemblies 26.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 26 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 26 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 26 are variable speed propulsion assemblies having fixed pitch rotor blades and thrust vectoring capability. Depending upon the implementation, propulsion assemblies 26 may have longitudinal thrust vectoring capability, lateral thrust vectoring capability or omnidirectional thrust vectoring capability. In other embodiments, propulsion assemblies 26 may operate as single speed propulsion assemblies, may have variable pitch rotor blades and/or may be non-thrust vectoring propulsion assemblies.

Propulsion assemblies 26 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 26 can be decoupled from airframe 12 by simple operations and another propulsion assembly 26 can then be attached to airframe 12. In other embodiments, propulsion assemblies 26 may be permanently coupled to wings 14, 16.

Referring to FIG. 1i, component parts of propulsion assembly 26d will now be described. It is noted that propulsion assembly 26d is representative of each propulsion assembly 26 therefore, for sake of efficiency, certain features have been disclosed only with reference to propulsion assembly 26d. One having ordinary skill in the art, however, will fully appreciate an understanding of each propulsion assembly 26 based upon the disclosure herein of propulsion assembly 26d. In the illustrated embodiment, propulsion assembly 26d includes a nacelle 28 that houses components including a battery 28a, an electronic speed controller 28b, one or more actuators 28c, an electronics node 28d, one or more sensors 28e and other desired electronic equipment. Nacelle 28 also supports a propulsion system 28f including a gimbal 28g, a variable speed electric motor 28h and a rotor assembly 28i. Extending from a lower end of nacelle 28 is a tail assembly 28j that includes one or more aerosurfaces 28k. In the illustrated embodiment, aerosurfaces 28k include stationary horizontal and vertical stabilizers. In other embodiments, aerosurfaces 28k may be active aerosurfaces that serve as elevators to control the pitch or angle of attack of wings 14, 16 and/or ailerons to control the roll or bank of aircraft 10 in the forward flight orientation of aircraft 10. Aerosurfaces 28k also serve to enhance hover stability in the VTOL orientation of aircraft 10.

Flight control system 22 communicates via a wired communications network within airframe 12 with electronics nodes 28d of propulsion assemblies 26. Flight control system 22 receives sensor data from sensors 28e and sends flight command information to the electronics nodes 28d such that each propulsion assembly 26 may be individually and independently controlled and operated. For example, flight control system 22 is operable to individually and independently control the speed and the thrust vector of each propulsion system 28f. Flight control system 22 may autonomously control some or all aspects of flight operation for aircraft 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for aircraft 10.

Aircraft 10 has a landing gear assembly 30 that includes a plurality of landing feet depicted as landing foot 30a coupled to a lower or aft end of propulsion assembly 26a, landing foot 30b coupled to a lower or aft end of propulsion assembly 26b, landing foot 30c coupled to a lower or aft end of propulsion assembly 26c and landing foot 30d coupled to a lower or aft end of propulsion assembly 26d. By positioning landing feet 30a, 30b, 30c, 30d at the lower end of wingtip mounted propulsion assemblies 26, landing feet 30a, 30b, 30c, 30d are positioned at the maximum outboard distance from the center of gravity of aircraft 10 located, for example, at the intersection of axes 10a, 10b, 10c, which provides for maximum landing stability and tip-over stability for aircraft 10.

Aircraft 10 is configured to transport a tow line 32. Tow line 32 may be a lightweight cord or cable used to span a distance or gap, and which is later used to pull a larger cable or hose. While aircraft 10 drags tow line 32 over a body of water or other terrain, tow line 32 is susceptible to being caught on a variety of snag hazards such as rock or land formations, boats, trees, vehicles, high surface friction or other objects or forces. Tow line 32 may also become tangled on itself while being deployed. When a snag hazard is encountered, sudden spikes in tow line tension may cause aircraft 10 to dynamically roll over or even crash. Unmanned aircraft such as aircraft 10 may be particularly susceptible to rolling over since unmanned aircraft often lack the inertial reference available to pilots on manned aircraft.

Aircraft 10 includes a tow line tension management system to prevent high or sudden changes in tension in tow line 32 from endangering aircraft 10. Tow line 32 is attached to a tow line interface assembly 34 via a tow line coupling 36. Tow line interface assembly 34 includes an attenuation spool 38 rotatably coupled to airframe 12. More specifically, attenuation spool 38 is rotatably coupled between pylons 18, 20 on spool mount 40, which forms or includes the rotational axis of attenuation spool 38. Attenuation spool 38 is located at approximately the center of gravity of aircraft 10 at or near the intersection of axes 10a, 10b, 10c, but may be located at other locations of aircraft 10 in other embodiments.

Tow line interface assembly 34 also includes an attenuation cable 42 having a proximal end coupled to or abutting attenuation spool 38 and a distal end coupled to tow line 32 at tow line coupling 36. Attenuation cable 42 is partially or fully wound around attenuation spool 38. When the tension in tow line 32 increases, such as when a snag hazard is encountered, the slack provided by the length of attenuation cable 42 wrapped around attenuation spool 38 acts as a buffer to reduce the load on aircraft 10. In response to an increase in tow line tension, attenuation spool 38 rotates in a deployment rotational direction 44 to deploy or extend attenuation cable 42, thus attenuating the load on airframe 12. The amount of attenuation cable 42 wound around attenuation spool 38 may depend on the amount of buffer desired between increases in tow line tension and the load on aircraft 10, which in turn may depend on the anticipated speed of aircraft 10 or other factors. While attenuation cable 42 may be wound around attenuation spool 38 any number of times, in the illustrated embodiment attenuation cable 42 is wound around attenuation spool 38 about three times. Additional revolutions of attenuation cable 42 around attenuation spool 38 provide additional buffer to ensure that if a snag is encountered, aircraft 10 does not experience a hard stop. Tow line interface assembly 34 also includes a coil spring 46, which biases attenuation spool 38 in a retraction rotational direction 48 to retract attenuation cable 42 when the biasing force of coil spring 46 exceeds the tow line tension. Thus, after transient increases in tow line tension are encountered and tow line tension begins to fall back to previous levels, coil spring 46 rewinds attenuation cable 42 back onto attenuation spool 38 to safeguard against future increases in tow line tension. To combat more severe or prolonged spikes in tow line tension, attenuation cable 42 may include a mechanical fuse 50 such as a shear pin that is breakable to detach tow line 32 from aircraft 10. Instead of being a separate device, in other embodiments mechanical fuse 50 may be the friction between attenuation cable 42 and attenuation spool 38. Mechanical fuse 50 may be caused to detach tow line 32 from aircraft 10 when the tow line tension exceeds a predetermined threshold, when the tow line tension rate of change exceeds a predetermined threshold or when attenuation spool 38 runs out of attenuation cable 42.

In addition to mechanical fuse 50 and the buffer provided by attenuation cable 42, the tow line tension management system of aircraft 10 also includes modules implemented by flight control system 22 to prevent the tension in tow line 32 from endangering aircraft 10. In particular, flight control system 22 includes a tow line tension monitoring module 52 in data communication with a spool sensor 54 to determine a tow line tension parameter. Spool sensor 54 detects movement of attenuation spool 38 and may be a spool position sensor that detects the position of attenuation spool 38. The tow line tension parameter calculated by tow line tension monitoring module 52 may be any parameter related to the tension of tow line 32 or attenuation cable 42 such as absolute tension, relative tension, acceleration of attenuation spool 38, rotational speed of attenuation spool 38, position of attenuation spool 38 and/or tension rate of change. In one example, spool sensor 54 detects the position of attenuation spool 38 and this detected position may be used by tow line tension monitoring module 52 to calculate the tension on attenuation cable 42 based on the known spring rate of coil spring 46. Also, the changing position of attenuation spool 38 as detected by spool sensor 54 may be used to calculate the tow line tension rate of change. Flight control system 22 also includes a tow line tension reaction module 56, which initiates an aircraft response such as a reduction in ground speed or a change in flight orientation based on the tow line tension parameter(s) detected by tow line tension monitoring module 52.

It should be appreciated that aircraft 10 is merely illustrative of a variety of aircraft that can implement the embodiments disclosed herein. Indeed, the tow line tension management systems of the illustrative embodiments may be implemented on any aircraft. Other aircraft implementations can include helicopters, quadcopters, hybrid aircraft, compound helicopters, tiltwing aircraft, tiltrotor aircraft, quad tiltrotor aircraft, gyrocopters, propeller-driven airplanes, drones and the like. As such, those skilled in the art will recognize that the tow line tension management systems of the illustrative embodiments can be integrated into a variety of aircraft configurations. It should be appreciated that even though aircraft are particularly well-suited to implement the embodiments of the present disclosure, non-aircraft vehicles and devices can also implement the embodiments.

Figure 2:
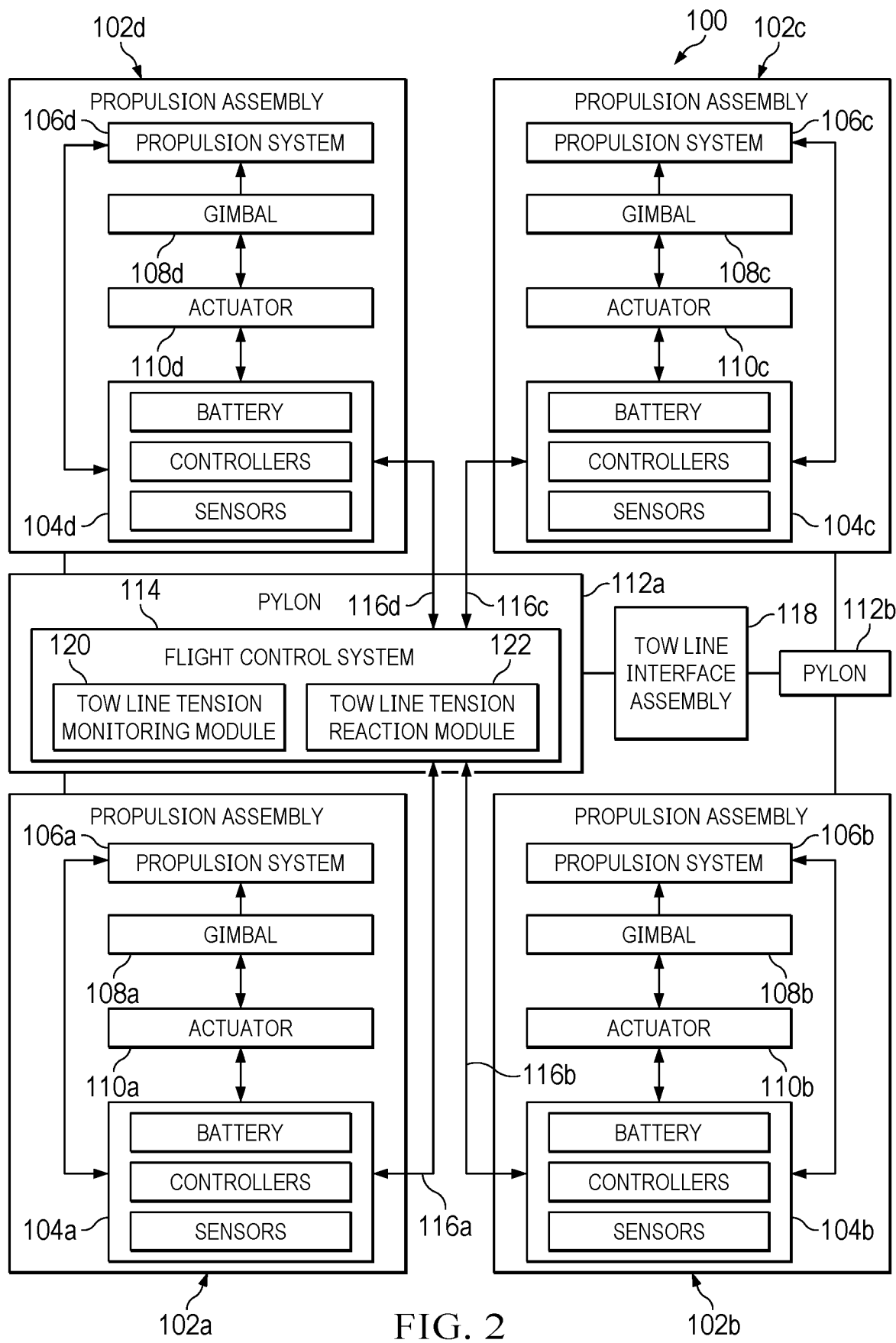
FIG. 2 is a block diagram of one implementation of a thrust array and a flight control system for an aircraft having a tow line tension management system in accordance with embodiments of the present disclosure.

Referring next to FIG. 2 in the drawings, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic components 104a including one or more batteries, one or more controllers and one or more sensors. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including one or more batteries, one or more controllers and one or more sensors. Propulsion assembly 102b also includes a propulsion system 106b and a two-axis gimbal 108b operated by one or more actuators 110b. Propulsion assembly 102c includes an electronics node 104c depicted as including one or more batteries, one or more controllers and one or more sensors. Propulsion assembly 102c also includes a propulsion system 106c and a two-axis gimbal 108c operated by one or more actuators 110c. Propulsion assembly 102d includes an electronics node 104d depicted as including one or more batteries, one or more controllers and one or more sensors. Propulsion assembly 102d also includes a propulsion system 106d and a two-axis gimbal 108d operated by one or more actuators 110d.

Propulsion assemblies 102a, 102b, 102c, 102d may be connected to one another in various configurations via pylons 112a, 112b. For example, propulsion assemblies 102a, 102b, 102c, 102d may be mounted on wings and the wings may be connected by pylons 112a, 112b. In other embodiments, one or more of propulsion assemblies 102a, 102b, 102c, 102d may be mounted directly onto pylons 112a, 112b. Flight control system 114 may be located in one of pylons 112a, 112b or elsewhere on aircraft 100. Flight control system 114 is operably associated with each of propulsion assemblies 102a, 102b, 102c, 102d and is linked to electronics nodes 104a, 104b, 104c, 104d by a fly-by-wire communications network depicted as arrows 116a, 116b, 116c, 116d. Flight control system 114 receives sensor data from and sends commands to propulsion assemblies 102a, 102b, 102c, 102d to enable flight control system 114 to independently control each of propulsion assemblies 102a, 102b, 102c, 102d, as discussed herein. Flight control system 114 is also in communication with tow line interface assembly 118 to manage the tension on a tow line connected to aircraft 100. Tow line tension monitoring module 120 receives sensory data from one or more sensors of tow line interface assembly 118 to determine one or more tow line tension parameters. Based on the one or more tow line tension parameters calculated by tow line tension monitoring module 120, tow line tension reaction module 122 issues commands to propulsion assemblies 102a, 102b, 102c, 102d to alleviate the load on aircraft 100 caused by the tow line. For example, tow line tension reaction module 122 may change the ground speed or flight orientation of aircraft 100.

Figure 3:
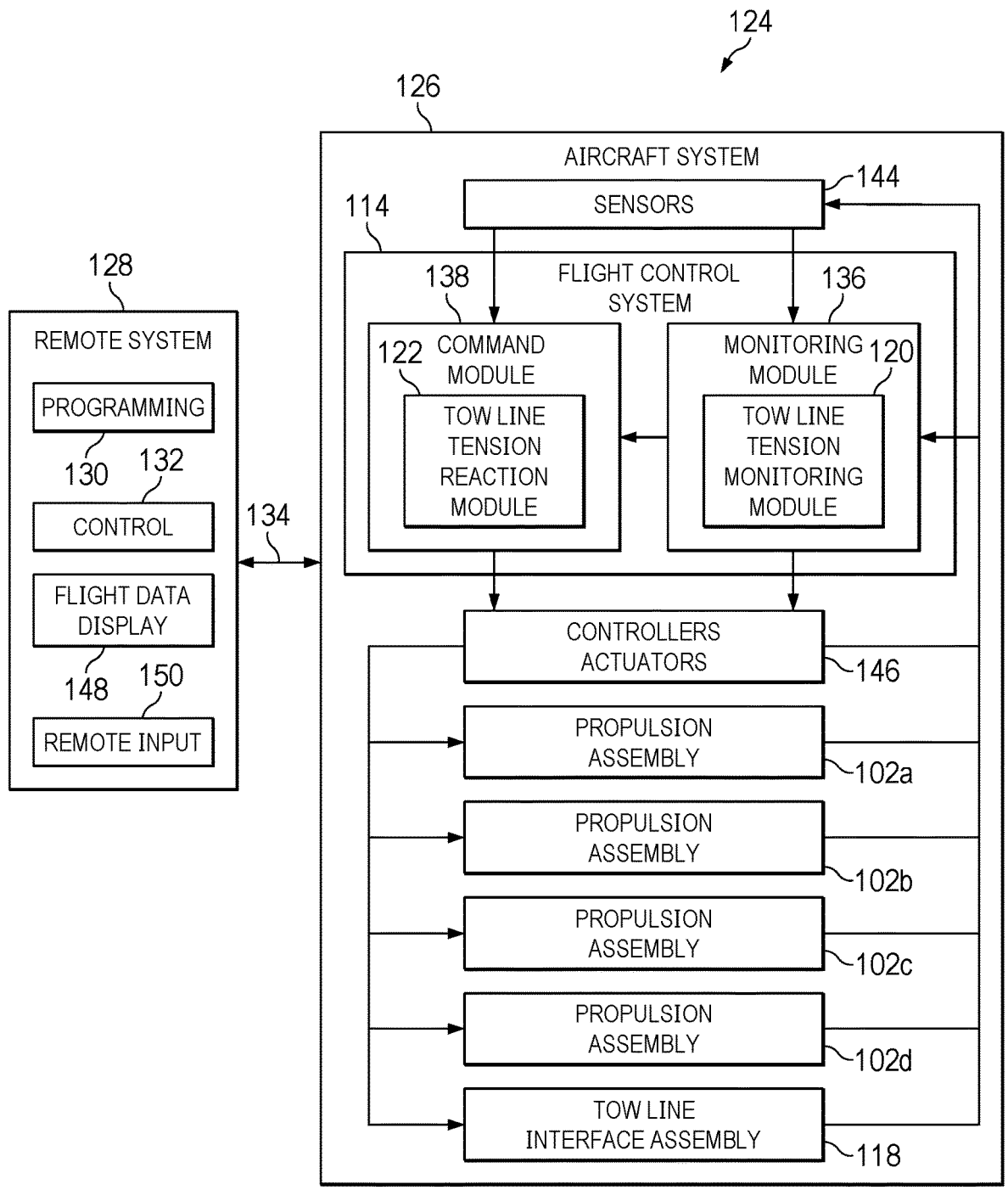
FIG. 3 is a block diagram of autonomous and remote control systems for an aircraft having a tow line tension management system in accordance with embodiments of the present disclosure.

Referring additionally to FIG. 3 in the drawings, a block diagram depicts a control system 124 operable for use with aircraft 100, aircraft 10 or other aircraft of the present disclosure. In the illustrated embodiment, control system 124 includes two primary computer based subsystems; namely, an aircraft system 126 and a remote system 128. In some implementations, remote system 128 includes a programming application 130 and a remote control application 132. Programming application 130 enables a user to provide a flight plan and mission information to aircraft 100 such that flight control system 114 may engage in autonomous control over aircraft 100. For example, programming application 130 may communicate with flight control system 114 over a wired or wireless communication channel 134 to provide a flight plan including, for example, a starting point, a trail of waypoints and an ending point such that flight control system 114 may use waypoint navigation during the mission. In addition, programming application 130 may provide one or more tasks to flight control system 114 for aircraft 100 to accomplish during the mission such as transporting a tow line to a desired location. Following programming, aircraft 100 may operate autonomously responsive to commands generated by flight control system 114.

In the illustrated embodiment, flight control system 114 includes a monitoring module 136 and a command module 138. Monitoring module 136 includes tow line tension monitoring module 120 to monitor the tension of a tow line connected to tow line interface assembly 118 and command module 138 includes tow line tension reaction module 122 to send commands initiating an aircraft response based on the tension of the tow line as detected by tow line tension monitoring module 120. It is to be understood by those skilled in the art that these and other modules executed by flight control system 114 may be implemented in a variety of forms including hardware, software, firmware, special purpose processors and/or combinations thereof. Flight control system 114 receives input from a variety of sources including internal sources such as sensors 144, controllers/actuators 146, propulsion assemblies 102a, 102b, 102c, 102d as well as external sources such as remote system 128, global positioning system satellites or other location positioning systems and the like.

During the various operating modes of aircraft 100 such as the vertical takeoff flight mode, the hover flight mode, the forward flight mode, transition flight modes and the vertical landing flight mode, command module 138 provides commands to controllers/actuators 146. These commands enable independent operation of propulsion assemblies 102a, 102b, 102c, 102d including rotor speed, thrust vector and the like. Flight control system 114 receives feedback from controllers/actuators 146, propulsion assemblies 102a, 102b, 102c, 102d and tow line interface assembly 118. This feedback is processed by monitoring module 136 that can supply correction data, tow line tension parameters and other information to command module 138 and to controllers/actuators 146. Sensors 144, such as an attitude and heading reference system (AHRS) with solid-state or microelectromechanical systems (MEMS), gyroscopes, accelerometers and magnetometers as well as other sensors including positioning sensors, speed sensors, environmental sensors, fuel sensors, temperature sensors, location sensors and the like also provide information to flight control system 114 to further enhance autonomous control capabilities.

Some or all of the autonomous control capability of flight control system 114 can be augmented or supplanted by remote flight control from, for example, remote system 128. Remote system 128 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 128 communicates with flight control system 114 via communication link 134 that may include both wired and wireless connections.

While operating remote control application 132, remote system 128 is configured to display information relating to one or more aircraft of the present disclosure on one or more flight data display devices 148. Display devices 148 may be configured in any suitable form, including, for example, liquid crystal displays, light emitting diode displays, augmented displays or any suitable type of display. Remote system 128 may also include audio output and input devices such as a microphone, speakers and/or an audio port allowing an operator to communicate with other operators or a base station. Display device 148 may also serve as a remote input device 150 if a touch screen display implementation is used, however, other remote input devices, such as a keyboard or joystick, may alternatively be used to allow an operator to provide control commands to an aircraft being operated responsive to remote control.

Figure 4D:
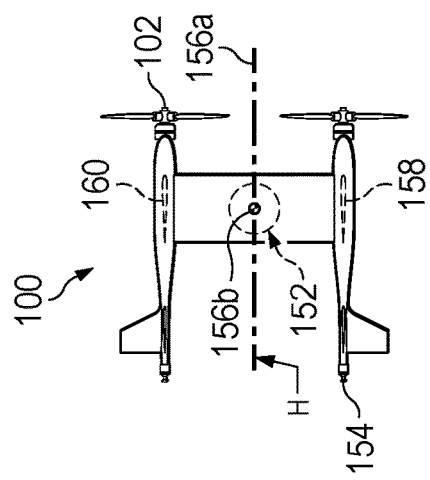
Figure 4C:
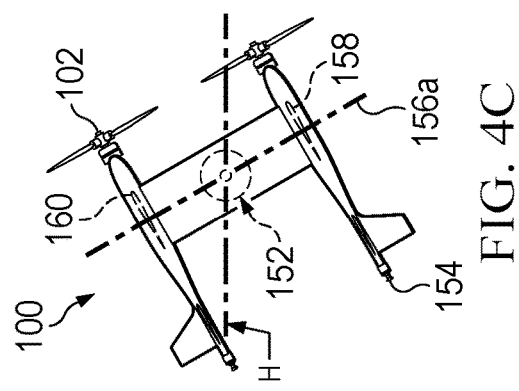
Figure 4B:
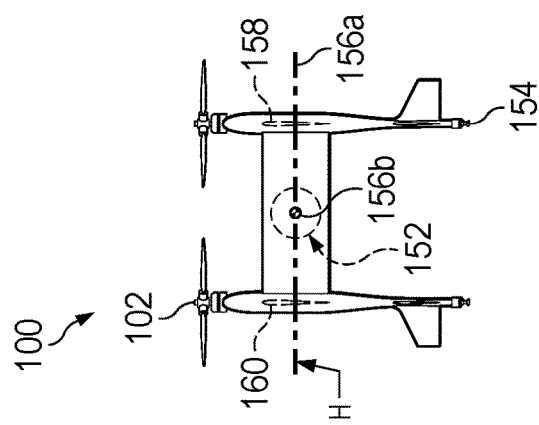
Figure 4A:
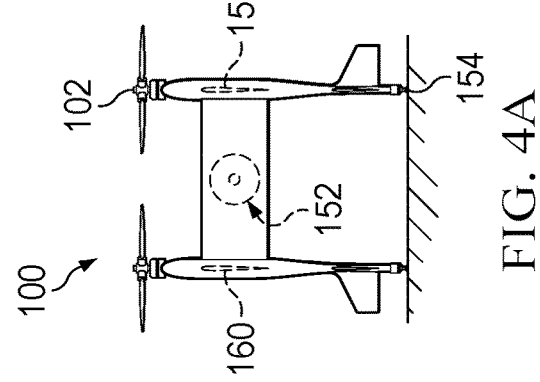

Referring additionally to FIGS. 4A-4I in the drawings, a sequential flight operating scenario of aircraft 100 including tow line tension management system 152 is depicted. While aircraft 100 is configured to deploy a tow line, the tow line has been omitted in the sequential flight operating scenario of FIGS. 4A-4I to illustrate various orientations, attitudes, altitudes and other attributes throughout the flight envelope of aircraft 100. As best seen in FIG. 4A, aircraft 100 is in a tailsitter position on a surface such as the ground, a helipad or the deck of an aircraft carrier with landing feet 154 in contact with the surface. When aircraft 100 is ready for a mission, flight control system 114 commences operations providing flight commands to the various components of aircraft 100. Flight control system 114 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight. In other implementations, aircraft 100 may be a manned aircraft operated at least in part by a pilot.

As best seen in FIG. 4B, aircraft 100 has performed a vertical takeoff and is engaged in thrust-borne lift in the VTOL orientation of aircraft 100. As illustrated, the rotor assemblies of propulsion assemblies 102 are each rotating in substantially the same horizontal plane. As longitudinal axis 156a and lateral axis 156b (denoted as the target) are both in a horizontal plane H that is normal to the local vertical in the earth's reference frame, aircraft 100 has a level flight attitude. In the VTOL orientation, wing 158 is the forward wing and wing 160 is the aft wing. As discussed herein, flight control system 114 independently controls and operates each propulsion assembly 102 including independently controlling speed and thrust vectoring. During hover, flight control system 114 may utilize differential speed control and/or differential or collective thrust vectoring of propulsion assemblies 102 to provide hover stability for aircraft 100 and to provide pitch, roll, yaw and translation authority for aircraft 100.

After vertical ascent to the desired elevation, aircraft 100 may begin the transition from thrust-borne lift to wing-borne lift. As best seen from the progression of FIGS. 4B-4D, aircraft 100 is operable to pitch down from the VTOL orientation toward the forward flight, or biplane, orientation to enable high speed and/or long range forward flight. As seen in FIG. 4C, longitudinal axis 156a extends out of the horizontal plane H such that aircraft 100 has an inclined flight attitude of about sixty degrees pitch down. Flight control system 114 may achieve this operation through speed control of some or all of propulsion assemblies 102, thrust vectoring of some or all of propulsion assemblies 102 or any combination thereof.

As best seen in FIGS. 4D and 4E, aircraft 100 has completed the transition to the forward flight orientation with the rotor assemblies of propulsion assemblies 102 each rotating in substantially the same vertical plane. In the forward flight orientation, wing 160 is the upper wing positioned above wing 158, which is the lower wing. By convention, longitudinal axis 156a has been reset to be in the horizontal plane H, which also includes lateral axis 156b, such that aircraft 100 has a level flight attitude in the forward flight orientation. As forward flight with wing-borne lift requires significantly less power than VTOL flight with thrust-borne lift, the operating speed of some or all of propulsion assemblies 102 may be reduced. In certain embodiments, some of propulsion assemblies 102 of aircraft 100 could be shut down during forward flight. In the forward flight orientation, the independent control provided by flight control system 114 over each propulsion assembly 102 provides pitch, roll and yaw authority for aircraft 100.

As aircraft 100 approaches target ground location 162, which may be a tow line destination depending on the mission, aircraft 100 may begin its transition from wing-borne lift to thrust-borne lift in a forward flight-to-VTOL transition phase best seen from the progression of FIGS. 4E-4G. Aircraft 100 is operable to pitch up from the forward flight orientation to the VTOL orientation to enable, as in the illustrated example, a vertical landing operation. As seen in FIG. 4F, longitudinal axis 156a extends out of the horizontal plane H such that aircraft 100 has an inclined flight attitude of about thirty degrees pitch up. Flight control system 114 may achieve this operation through speed control of some or all of propulsion assemblies 102, thrust vectoring of some or all of propulsion assemblies 102 or any combination thereof. In FIG. 4G, aircraft 100 has completed the transition from the forward flight orientation to the VTOL orientation. By convention, longitudinal axis 156a has been reset to be in the horizontal plane H which also includes lateral axis 156b such that aircraft 100 has a level flight attitude in the VTOL orientation. Once aircraft 100 has completed the transition to the VTOL orientation, aircraft 100 may hover and commence its vertical descent to target ground location 162. In FIG. 4H, aircraft 100 descends toward target ground location 162, which in the illustrated embodiment is a landing zone. In FIG. 4I, aircraft 100 rests in its tailsitter orientation on landing zone 162.

Figure 5A:
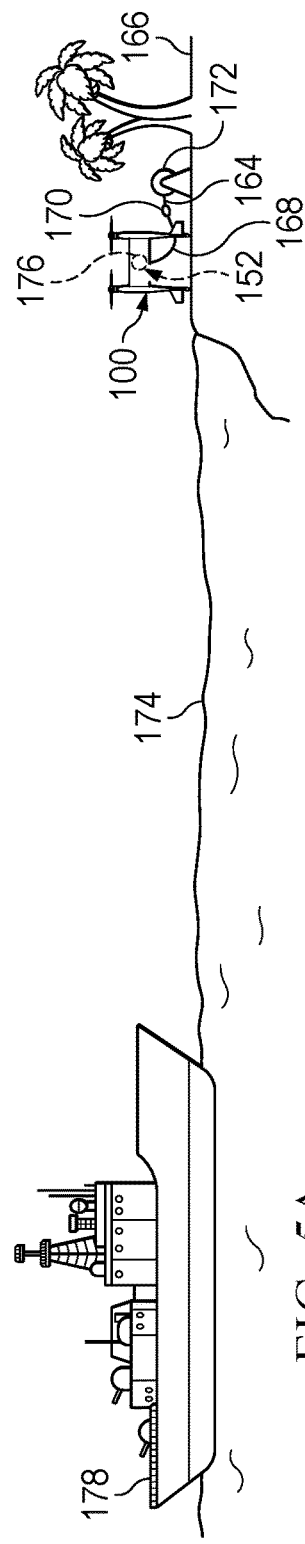
FIGS. 5A-5C are schematic illustrations of an aircraft with a tow line tension management system in a sequential tow line deployment flight operating scenario in accordance with embodiments of the present disclosure.
Figure 5B:
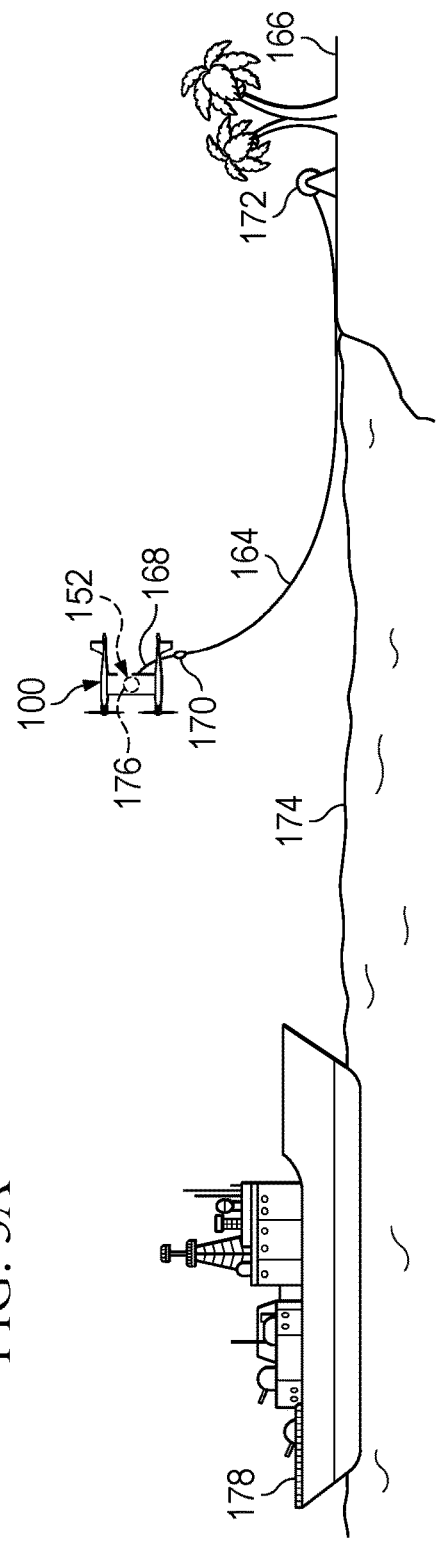
Figure 5C:
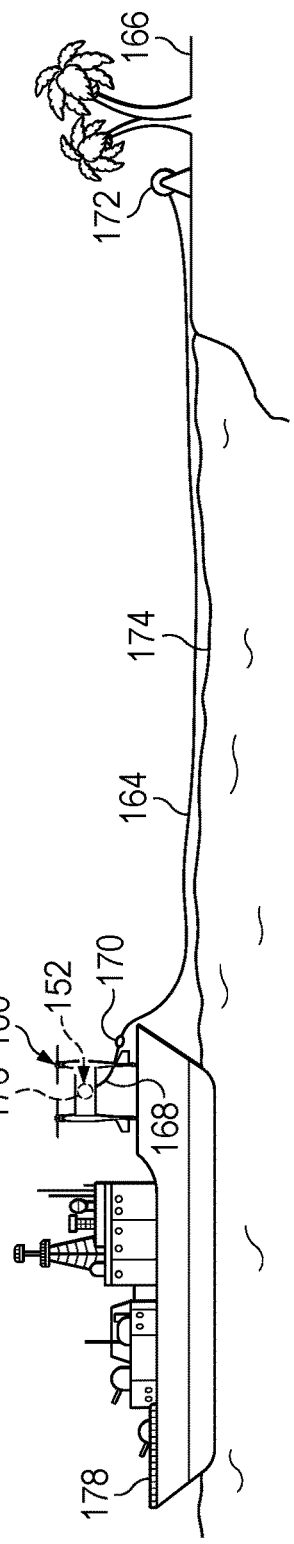

Referring additionally to FIGS. 5A-5C in the drawings, a sequential flight operating scenario of aircraft 100 including tow line tension management system 152 is depicted in which aircraft 100 delivers tow line 164 to a destination. To illustrate a typical tow line deployment mission, no snag hazards are present and the tension of tow line 164 does not pose a threat to the mission of aircraft 100 in the example flight operating scenario of FIGS. 5A-5C. In FIG. 5A, aircraft 100 is in a tailsitter position on the ground of shore 166. A ground crew may attach tow line 164 to attenuation cable 168 of tow line tension management system 152 at tow line coupling 170. A length of tow line 164 long enough for aircraft 100 to reach its destination is wound around tow line spool 172, which may be stationary on shore 166. Aircraft 100 initiates an autonomous vertical takeoff and then converts to the forward flight orientation to traverse body of water 174 as shown in FIG. 5B. As aircraft 100 flies toward its destination, tow line 164 unwinds from tow line spool 172 and is dragged along the surface over which aircraft 100 flies including body of water 174. Tow line tension management system 152 monitors a tow line tension parameter of tow line 164 and the load exerted on aircraft 100 by tow line 164 during the tow line deployment mission. As aircraft 100 deploys additional tow line 164 along its flight path, the tow line tension detected by tow line tension management system 152 may gradually increase and thus less attenuation cable 168 may be wrapped around attenuation spool 176. To compensate for the reduced reaction time resulting from less attenuation cable 168 being wrapped around attenuation spool 176, tow line tension reaction module 122 may slow the ground speed of aircraft 100 as it approaches its destination. In FIG. 5C, aircraft 100 has reached its destination, which in the illustrated embodiment is a ship 178. Aircraft 100 has converted to the VTOL orientation and vertically descended onto ship 178 in its tailsitter position. Ship personnel may then detach tow line 164 from aircraft 100 so that tow line 164 may be used for a desired purpose. In alternative flight operating scenarios, tow line spool 172 may instead be located on ship 178 and aircraft 100 may deploy tow line 164 by flying from ship 178 to shore 166.

Figure 6:
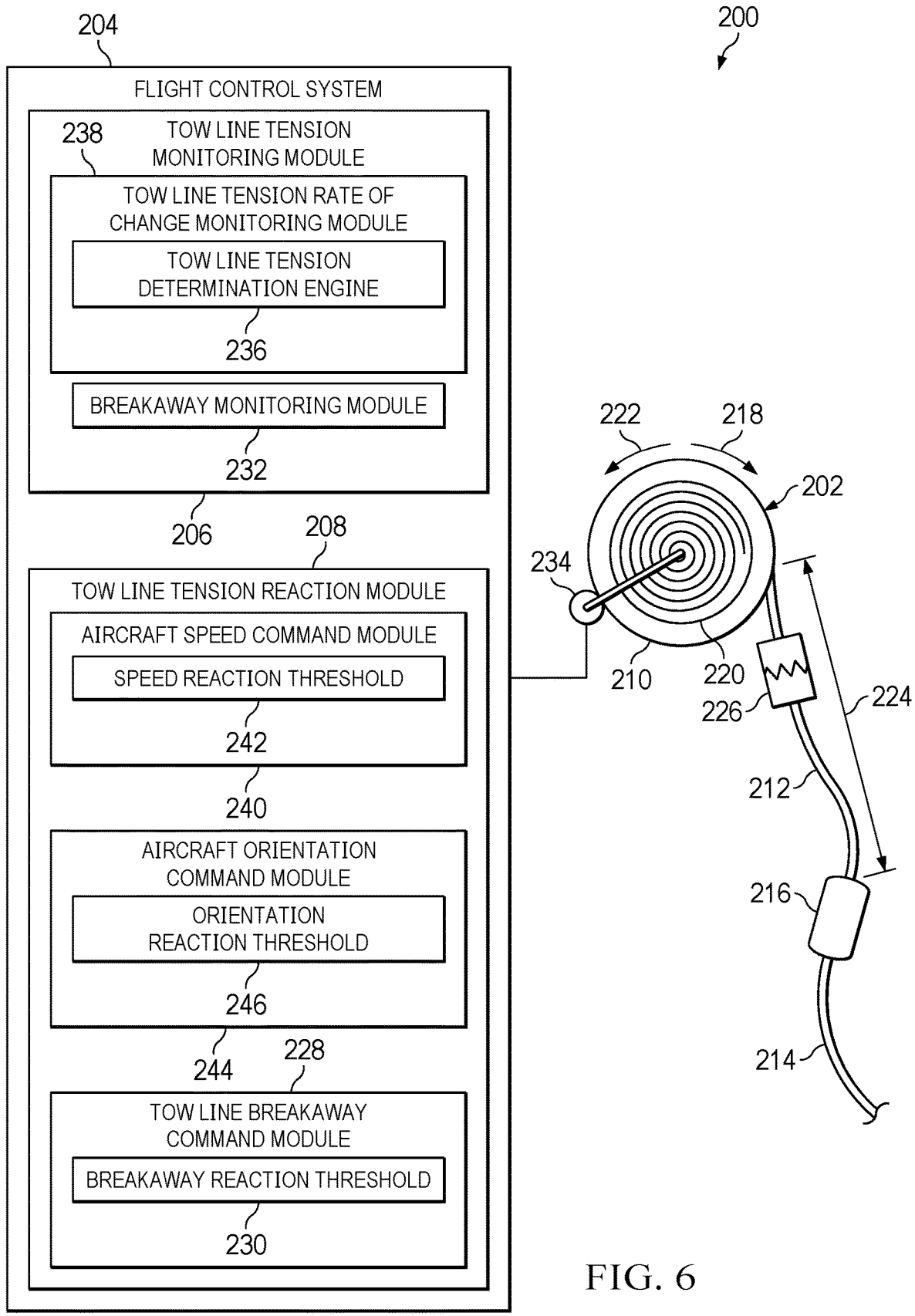
FIG. 6 is a block diagram of a tow line tension management system for an aircraft in accordance with embodiments of the present disclosure.

Referring to FIG. 6 in the drawings, a tow line tension management system for an aircraft is schematically illustrated and generally designated 200. Tow line tension management system 200 includes tow line interface assembly 202 and flight control system 204 implementing tow line tension monitoring module 206 and tow line tension reaction module 208. Tow line interface assembly 202 includes attenuation spool 210 coupled to the airframe of the aircraft as shown, for example, in FIGS. 1A-1B. The proximal end of attenuation cable 212 is coupled to attenuation spool 210 and the distal end of attenuation cable 212 is coupled to tow line 214 via tow line coupling 216. While attenuation cable 212 is normally wrapped around attenuation spool 210 during operation of the aircraft, for illustrative purposes attenuation cable 212 is shown at least partially or fully extended from attenuation spool 210 in FIG. 6.

As a first line of defense against high or sudden spikes in tension of tow line 214, attenuation spool 210 is rotatable in deployment rotational direction 218 to deploy or extend attenuation cable 212 in response to an increase in tow line tension, thus counteracting the biasing force of coil spring 220, which biases attenuation spool 210 in retraction rotational direction 222. Extending attenuation cable 212 in response to tow line tension aberrations in this manner alleviates the load on the airframe of the aircraft while the retracting action of coil spring 220 reloads attenuation cable 212 onto attenuation spool 210 when the tow line tension subsides and the coil spring biasing force exceeds the tow line tension. This first line of defense against tow line tension spikes reduces the need for the aircraft to take more drastic anti-tension measures such as flight maneuvers or aborting the tow line deployment mission altogether. The amount of tension buffer provided by attenuation cable 212 is dependent on, inter alia, length 224 of attenuation cable 212, which may vary depending on the amount of desired attenuation. By way of non-limiting example, the number of revolutions of attenuation cable 212 around attenuation spool 210 may be in a range from less than one revolution to seven or more revolutions and length 224 of attenuation cable 212 may be on the order of a few feet or meters to dozens of feet or meters. Length 224 of attenuation cable 212 may also be determined based on other factors such as the speed of the aircraft. For example, a higher speed aircraft may require a longer attenuation cable 212 around attenuation spool 210 to provide more buffer response time should tow line 214 snag. A longer attenuation cable 212 may also prevent mechanical fuse 226 from being broken prematurely.

In the illustrated embodiment, mechanical fuse 226 is a fusible link such as a shear pin. Mechanical fuse 226 has a breakaway reaction threshold that, if exceeded, causes mechanical fuse 226 to fracture, thereby detaching tow line 214 from the aircraft. The tension value of the breakaway reaction threshold may depend on the structural properties of mechanical fuse 226 such as the strength or configuration of the components therein. In one non-limiting example, if a tow line tension parameter such as absolute tension or tension rate of change exceeds the breakaway reaction threshold, mechanical fuse 226 may structurally fail, causing tow line 214 to detach from the aircraft. In the illustrated embodiment, mechanical fuse 226 forms part of attenuation cable 212. Mechanical fuse 226, however, may take on a variety of different forms and configurations. For example, mechanical fuse 226 may be integrated with tow line coupling 216. Mechanical fuse 226 may also be located at the proximal end of attenuation cable 212 so as to be interposed between attenuation cable 212 and attenuation spool 210, thereby acting as the coupling between attenuation cable 212 and attenuation spool 210. In other examples, mechanical fuse 226 may be integrated into the structure mounting attenuation spool 210 to the airframe of the aircraft such as spool mount 40 shown in FIGS. 1A-1B. In other embodiments, mechanical fuse 226 may instead be the friction between attenuation cable 212 and attenuation spool 210 so that attenuation cable 212 falls off attenuation spool 210 when the entire length of attenuation cable 212 has been deployed.

In yet other embodiments, mechanical fuse 226 may be an electrically-actuated mechanical fuse. In such embodiments, tow line tension reaction module 208 includes a tow line breakaway command module 228 that sends a release command to the electrically-actuated mechanical fuse in response to a tow line tension parameter such as tow line tension or tow line tension rate of change exceeding breakaway reaction threshold 230. The release command may be sent to the electrically-actuated mechanical fuse using either a wired or wireless communication link. Upon receiving the release command, the electrically-actuated mechanical fuse disengages to release tow line 214 from the aircraft. Tow line tension monitoring module 206 may include a breakaway monitoring module 232 to monitor whether mechanical fuse 226 has been broken. If breakaway monitoring module 232 detects that mechanical fuse 226 has been broken, flight control system 204 may send a signal or notification to a remote control station and/or the operator of the aircraft indicating that tow line 214 is no longer attached to the aircraft, at which point the aircraft may be commanded to abort its tow line deployment mission.

In the illustrated embodiment, spool sensor 234 is a roller engaged with attenuation spool 210 to detect rotational movement of attenuation spool 210 in either rotational direction 218, 222. Spool sensor 234 may be an absolute or relative position sensor depending on the implementation. Spool sensor 234 is in data communication with tow line tension monitoring module 206, which determines tow line tension parameters based on the movement of attenuation spool 210. The tow line tension parameter(s) calculated by tow line tension monitoring module 206 may be any parameter related to the tension of tow line 214 or attenuation cable 212 such as absolute tension, relative tension, acceleration of attenuation spool 210, rotational speed of attenuation spool 210, position of attenuation spool 210 and/or tension rate of change. Tow line tension monitoring module 206 includes a tow line tension determination engine 236, which determines the tension of tow line 214. In one example, tow line tension determination engine 236 may use the sensory data from spool sensor 234 and the spring rate of coil spring 220 to determine the load on attenuation spool 210 and/or tow line tension. Tow line tension monitoring module 206 also includes tow line tension rate of change monitoring module 238 to determine a tow line tension rate of change. In one example, tow line tension rate of change monitoring module 238 determines the tow line tension rate of change based on the rotational movement of attenuation spool 210 as detected by spool sensor 234 such as the acceleration, rotational speed and/or position of attenuation spool 210. The tow line tension rate of change may also be determined based on the changing tension calculated by tow line tension determination engine 236.

Tow line tension reaction module 208 initiates or commands an aircraft response based on the tow line tension parameter determined by tow line tension monitoring module 206. Tow line tension reaction module 208 includes an aircraft speed command module 240 to reduce the speed of the aircraft in response to the tow line tension parameter exceeding a speed reaction threshold 242. For example, aircraft speed command module 240 may reduce the ground speed of the aircraft if the tow line tension rate of change detected by tow line tension rate of change monitoring module 238 exceeds a tow line tension rate of change speed reaction threshold 242. Furthermore, aircraft speed command module 240 may reduce the ground speed of the aircraft while the aircraft is in either a VTOL or forward flight orientation. Tow line tension reaction module 208 also includes an aircraft orientation command module 244 to change the flight orientation of the aircraft to the VTOL orientation in response to the tow line tension parameter exceeding an orientation reaction threshold 246, which may be higher than speed reaction threshold 242. For example, aircraft orientation command module 244 may transition the flight orientation of the aircraft if the tow line tension rate of change detected by tow line tension rate of change monitoring module 238 exceeds a tow line tension rate of change orientation reaction threshold 246. In certain examples, aircraft orientation command module 244 may transition the aircraft from the forward flight orientation to the VTOL orientation when orientation reaction threshold 246 is exceeded. Aircraft orientation command module 244 may also transition the aircraft from a conversion orientation such as a 45-degree conversion orientation to the VTOL orientation when orientation reaction threshold 246 is exceeded. Tow line tension management system 200 thus provides several lines of defense against the tension in tow line 214 endangering the aircraft including providing buffer attenuation cable 212 around attenuation spool 210, mechanical fuse 226, speed reduction via aircraft speed command module 240 and/or aircraft orientation control via aircraft orientation command module 244.

Figure 7A:
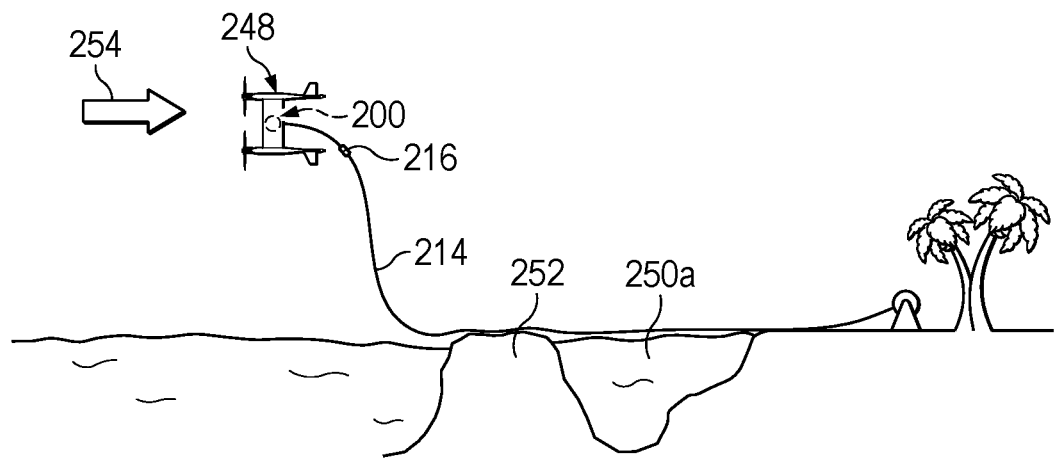
FIGS. 7A-7E are schematic illustrations of an aircraft with a tow line tension management system in various sequential tow line deployment flight operating scenarios in accordance with embodiments of the present disclosure.

Referring additionally to FIGS. 7A-7E in the drawings, various sequential tow line deployment flight operating scenarios are schematically illustrated to demonstrate some aspects of the operation of tow line tension management system 200. In FIG. 7A, aircraft 248 is in the forward flight orientation while transporting tow line 214 across body of water 250a. Tow line 214 is connected to tow line tension management system 200 at tow line coupling 216. During flight, tow line 214 is dragged across a snag hazard depicted as rock formation 252, causing attenuation spool 210 to go out of detent and the tow line tension rate of change as detected by tow line tension rate of change monitoring module 238 to exceed speed reaction threshold 242. In some cases, tow line 214 may then stabilize at a certain increased tension. In response, aircraft speed command module 240 reduces the ground speed or translation of aircraft 248 to prevent current or future increases in tow line tension from adversely affecting the flight of aircraft 248. The reduction in ground speed is indicated by arrow 254. Flight control system 204 may then indicate to an operator of aircraft 248 the magnitude of the tension or load on aircraft 248.

Figure 7B:
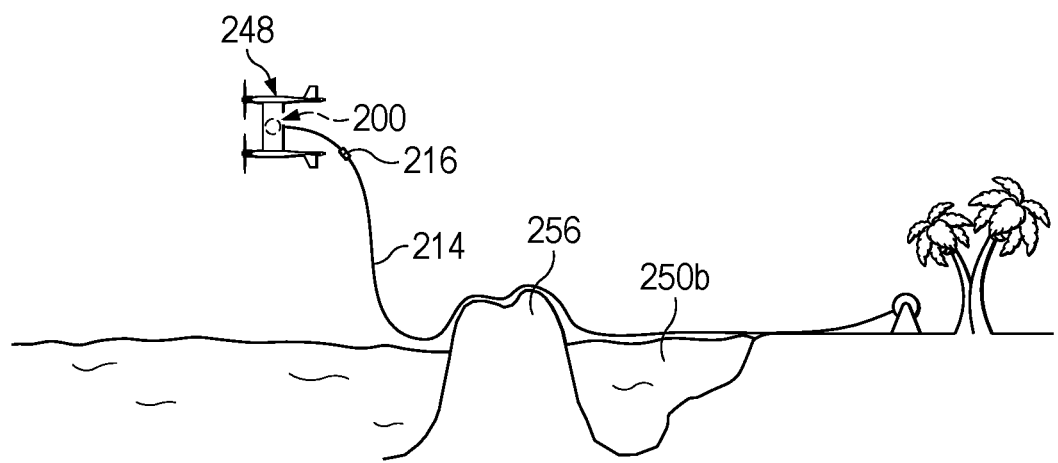
Figure 7C:
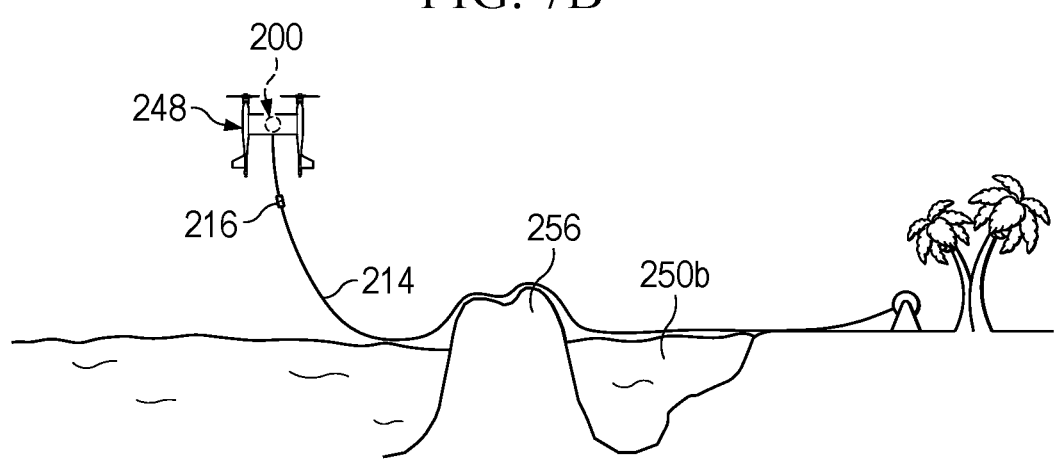

In FIG. 7B, aircraft 248 is in the forward flight orientation while transporting tow line 214 across body of water 250b. Tow line 214 is connected to tow line tension management system 200 at tow line coupling 216. During flight, tow line 214 is dragged across a snag hazard depicted as rock formation 256, causing attenuation spool 210 to go significantly out of detent and the tow line tension rate of change as detected by tow line tension rate of change monitoring module 238 to exceed orientation reaction threshold 246, which may be a dangerously high tow line tension rate of change. In response, aircraft orientation command module 244 changes the flight orientation of aircraft 248 to the VTOL orientation as shown in FIG. 7C. In addition to autonomously transitioning aircraft 248 to hover, aircraft orientation command module 244 may command aircraft 248 to fly backwards if needed to alleviate the tension on tow line 214.

Figure 7D:
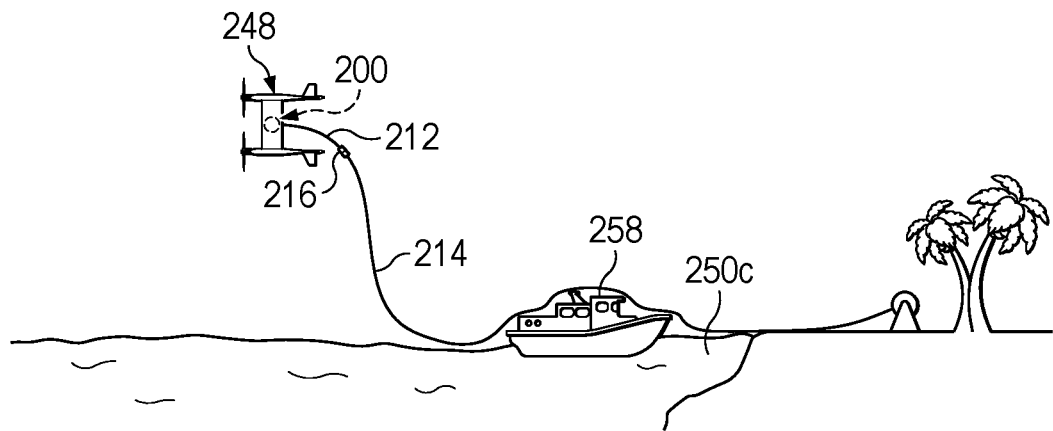
Figure 7E:
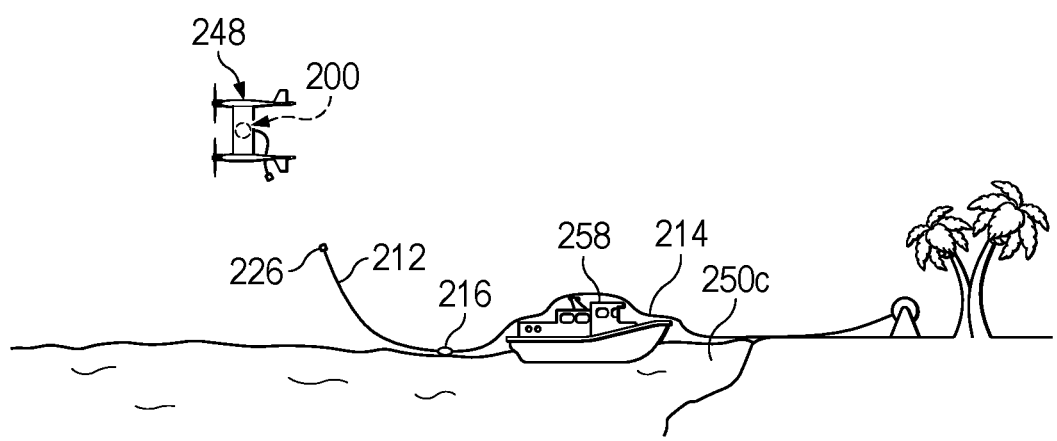

In FIG. 7D, aircraft 248 is in the forward flight orientation while transporting tow line 214 across body of water 250c. Tow line 214 is connected to tow line tension management system 200 at tow line coupling 216. During flight, tow line 214 is dragged across a snag hazard depicted as boat 258, causing tow line 214 to be dragged away from aircraft 248 before aircraft 248 can respond by changing speed or flight orientation. In FIG. 7E, all of attenuation cable 212 has been rapidly unwound from attenuation spool 210, leaving mechanical fuse 226 as a backup line of defense preventing the tension in tow line 214 from endangering aircraft 248. The tension in tow line 214 exceeds the breakaway reaction threshold that causes mechanical fuse 226 to fracture. When mechanical fuse 226 fractures, tow line 214 detaches from aircraft 248, thereby preventing aircraft 248 from dynamically rolling over or crashing.

Figure 8A:
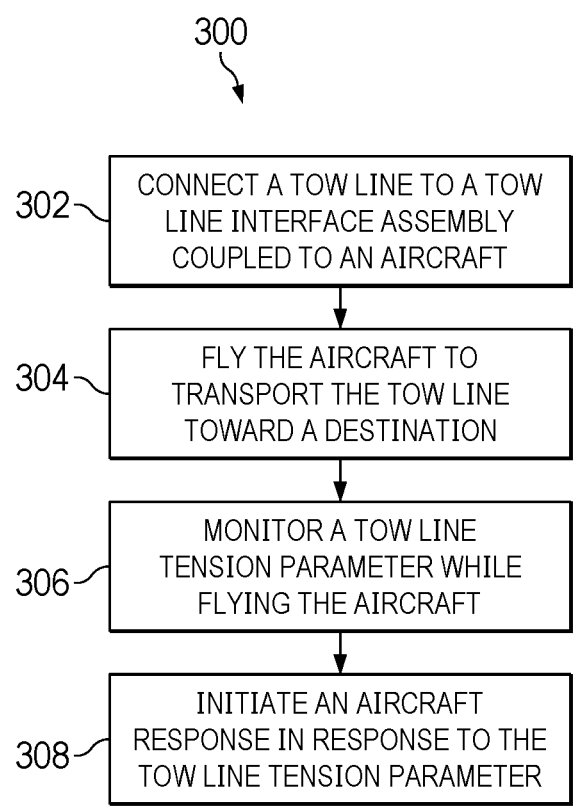
FIGS. 8A-8B are flowcharts of various methods for managing tow line tension for an aircraft in accordance with embodiments of the present disclosure.
Figure 8B:
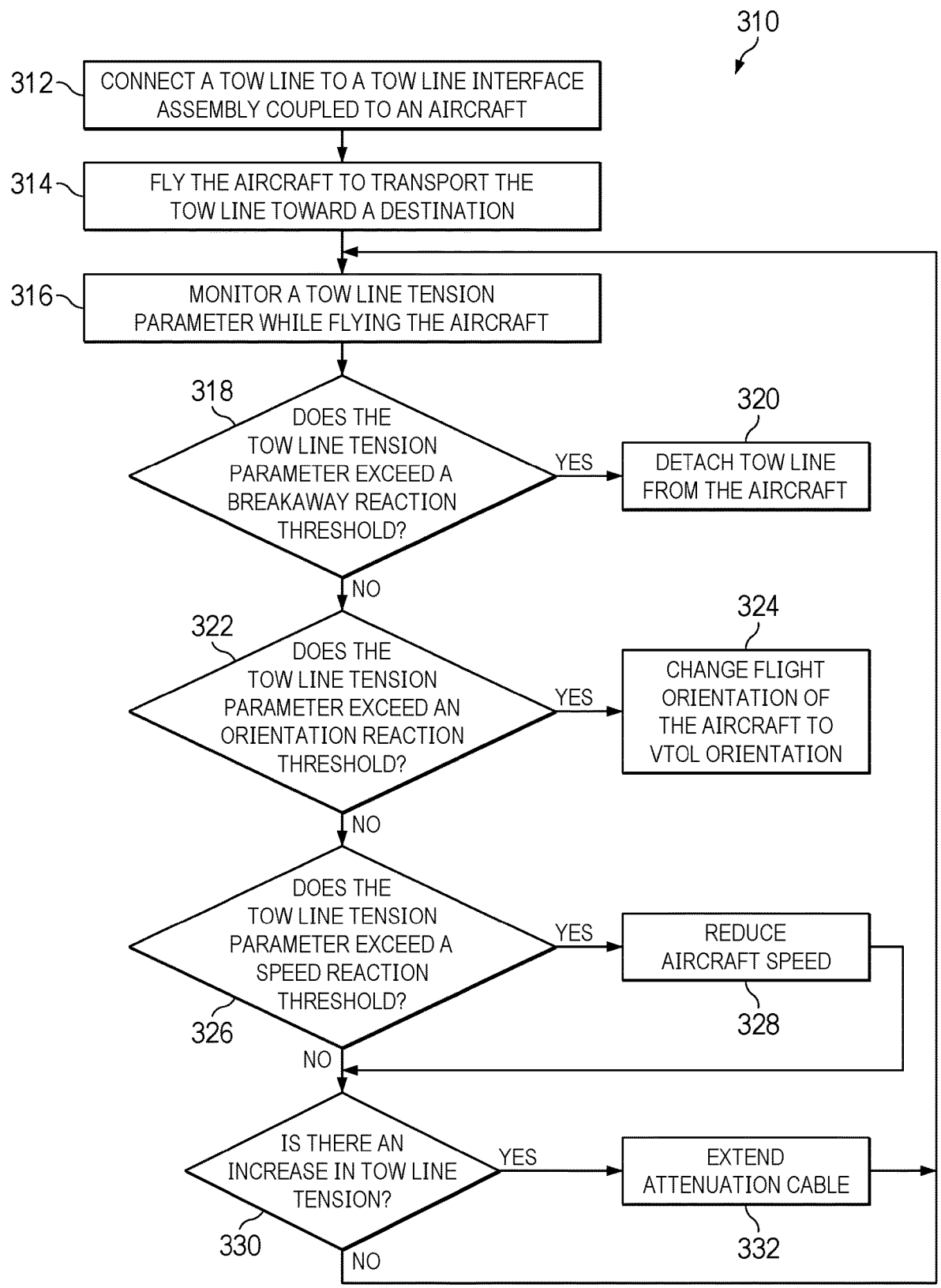

Referring to FIGS. 8A-8B in the drawings, various methods for managing tow line tension for an aircraft are depicted. In FIG. 8A, method 300 includes connecting a tow line to a tow line interface assembly coupled to an aircraft (step 302), flying the aircraft to transport the tow line toward a destination (step 304), monitoring a tow line tension parameter while flying the aircraft (step 306) and initiating an aircraft response in response to the tow line tension parameter (step 308). In FIG. 8B, method 310 includes connecting a tow line to a tow line interface assembly coupled to an aircraft (step 312), flying the aircraft to transport the tow line toward a destination (step 314) and monitoring a tow line tension parameter while flying the aircraft (step 316). Method 310 determines whether the tow line tension parameter exceeds a breakaway reaction threshold (step 318). If method 310 determines that the tow line tension parameter exceeds the breakaway reaction threshold, method 310 detaches the tow line from the aircraft, thereby aborting the tow line deployment mission (step 320). If method 310 determines that the tow line tension parameter does not exceed the breakaway reaction threshold, method 310 determines whether the tow line tension parameter exceeds an orientation reaction threshold (step 322). If method 310 determines that the tow line tension parameter exceeds the orientation reaction threshold, method 310 changes the flight orientation of the aircraft to the VTOL orientation (step 324). The aircraft may then hover backwards, land, perform a maneuver, convert back to the forward flight orientation or abort the tow line deployment mission altogether as desired by the aircraft operator. If method 310 determines that the tow line tension parameter does not exceed the orientation reaction threshold, method 310 determines whether the tow line tension parameter exceeds a speed reaction threshold (step 326). If method 310 determines that the tow line tension parameter exceeds the speed reaction threshold, method 310 reduces the speed of the aircraft (step 328) and then proceeds to step 330. If method 310 determines that the tow line tension parameter does not exceed the speed reaction threshold, method 310 determines whether the tow line tension has increased (step 330). If method 310 determines that the tow line tension has increased, method 310 extends the attenuation cable (step 332) and continues to step 316. If method 310 determines that the tow line tension has not increased, the method continues to step 316. The illustrative embodiments of the tow line tension management system enhance the ability for aircraft to adapt to increases in tow line tension during a tow line deployment mission. The illustrative embodiments sense tension and changes in tension on a tow line, attenuate the load from a sudden snag, provide the aircraft with the ability to autonomously respond to snags and save the aircraft when the tow line is rapidly pulled away from the aircraft.

The flowcharts in the different depicted embodiments illustrate the architecture, functionality and operation of some possible implementations of apparatus, methods and computer program products. In this regard, each block in the flowchart may represent a module, segment or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 9A:
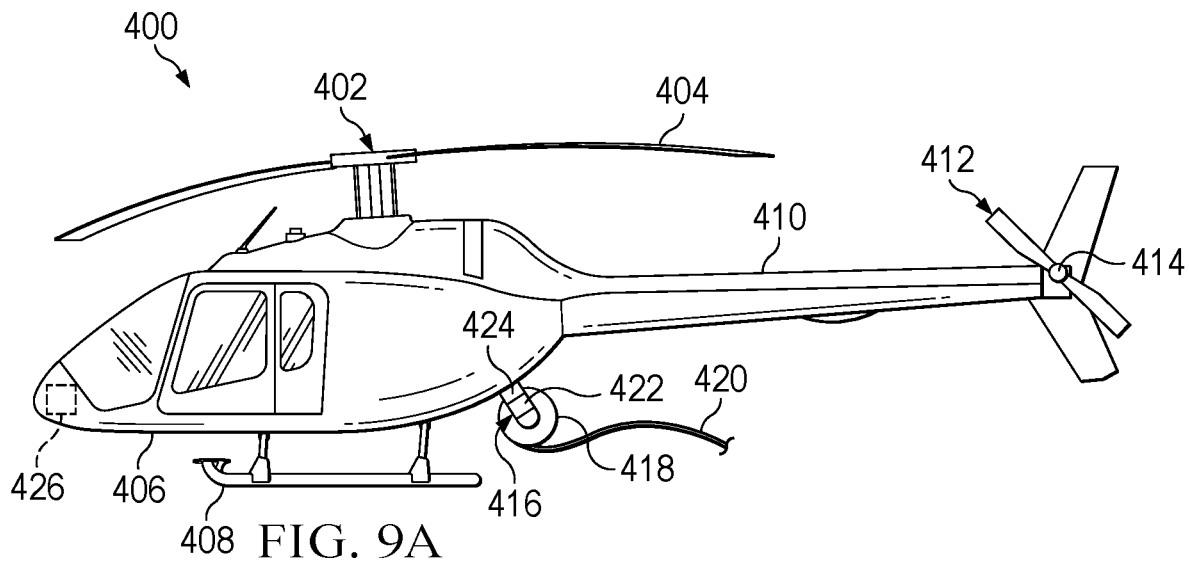
FIGS. 9A-9B are schematic illustrations of a helicopter having a tow line tension management system in accordance with embodiments of the present disclosure.
Figure 9B:
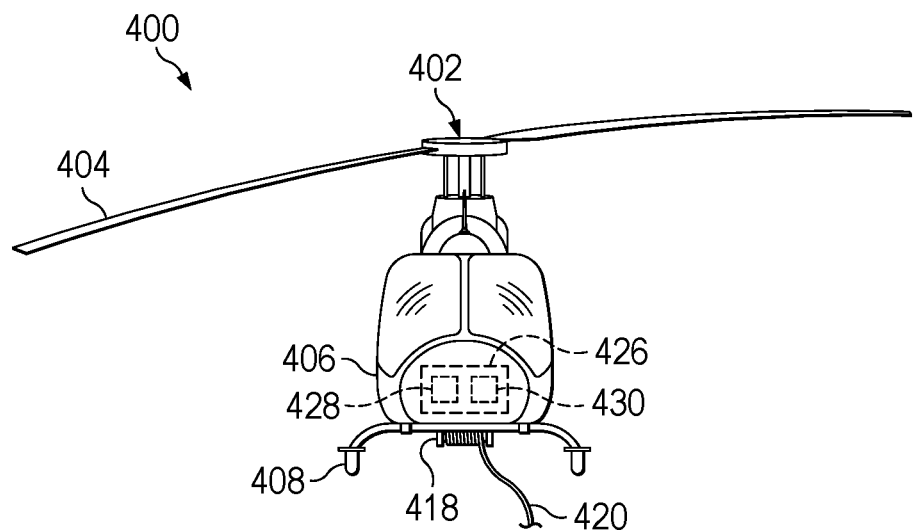

Referring to FIGS. 9A-9B in the drawings, a helicopter is schematically illustrated and generally designated 400. Helicopter 400 includes a rotor hub assembly 402, which includes a plurality of rotor blade assemblies 404. Rotor hub assembly 402 is rotatable relative to a fuselage 406 of helicopter 400. The pitch of rotor blade assemblies 404 can be collectively and/or cyclically manipulated to selectively control direction, thrust and lift of helicopter 400. A landing gear system 408 including skids provides ground support for helicopter 400. A tailboom 410 extends from fuselage 406. A tail rotor 412 includes a tail rotor hub assembly 414 that is rotatably coupled to the aft portion of tailboom 410. Helicopter 400 may be either a manned or unmanned helicopter.

A tow line spool mount 416 is coupled to an aft portion of fuselage 406. A tow line spool 418 is rotatably coupled to tow line spool mount 416. Instead of being spooled at a remote location, in the illustrated embodiment tow line 420 is located aboard helicopter 400 wound around tow line spool 418. Tow line spool mount 416 includes spool sensor 422 to detect movement of tow line spool 418. More particularly, spool sensor 422 includes a linear spring that allows the tension on tow line spool 418 to be detected based on the extent to which the linear spring is extended or compressed. Tow line spool mount 416 also includes mechanical fuse 424. If the tension or tension rate of change on tow line spool 418 exceeds a breakaway reaction threshold, mechanical fuse 424 fractures or breaks apart, causing tow line spool 418 to detach from fuselage 406. Helicopter 400 also includes flight control system 426 implementing tow line tension monitoring module 428 and tow line tension reaction module 430. Tow line tension monitoring module 428 communicates with the linear spring of spool sensor 422 to determine a tow line tension parameter and tow line tension reaction module 430 initiates an aircraft response such as a reduction in ground speed or a particular maneuver based on the tow line tension parameter calculated by tow line tension monitoring module 428.

Figure 10:
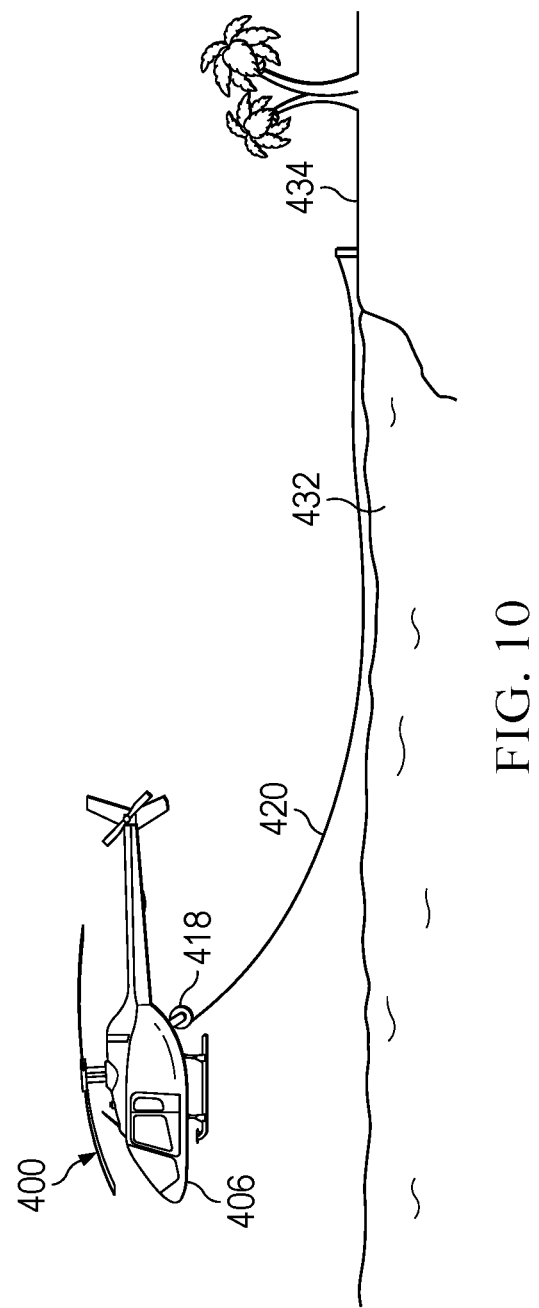
FIG. 10 is a schematic illustration of a helicopter with a tow line tension management system in a tow line deployment flight operating scenario in accordance with embodiments of the present disclosure.

Referring additionally to FIG. 10 in the drawings, helicopter 400 is depicted in a tow line deployment flight operating scenario. Helicopter 400 is transporting tow line 420 across body of water 432. Tow line 420 is spooled on tow line spool 418 and there is no need for tow line 420 to be spooled on shore 434. The tow line tension management system of the illustrated embodiment gives helicopter 400 the ability to respond to increases in the tension of tow line 420 in various ways. Such increases in tow line tension may be caused by snag hazards or by tow line 420 getting tangled on itself on tow line spool 418. For example, tow line tension reaction module 430 may reduce the ground speed of helicopter 400 if the tow line tension parameter detected by tow line tension monitoring module 428 exceeds a speed reaction threshold. In the event of an extreme spike in tow line tension, tow line spool 418 may break away from fuselage 406 at mechanical fuse 424. Indeed, the tow line tension management systems of the illustrative embodiments have widespread application on a large variety of aircraft and may be implemented whether the tow line is located on the aircraft or at a remote location.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tailsitter aircraft for deploying a tow line having a tow line tension, the tailsitter aircraft comprising:

an airframe including first and second wings with first and second pylons extending therebetween;

a thrust array attached to the airframe, the thrust array including a plurality of propulsion assemblies configured to transition the airframe between a forward flight orientation having wing-borne lift and a VTOL orientation having thrust-borne lift;

an attenuation spool coupled to the airframe;

an attenuation cable having a first end coupled to the attenuation spool and a second end coupled to the tow line, the attenuation cable at least partially wound around the attenuation spool;

a spool sensor configured to detect movement of the attenuation spool; and a flight control system implementing a tow line tension monitoring module in communication with the spool sensor to determine a tow line tension parameter and a tow line tension reaction module configured to initiate an aircraft response based on the tow line tension parameter.

2. The tailsitter aircraft as recited in claim 1 wherein the attenuation spool is rotatable in a deployment rotational direction to deploy the attenuation cable in response to an increase in the tow line tension, thereby attenuating a load on the airframe.

3. The tailsitter aircraft as recited in claim 2 further comprising a coil spring coupled to the attenuation spool, the coil spring biasing the attenuation spool in a retraction rotational direction to retract the attenuation cable in response to the coil spring biasing force exceeding the tow line tension.

4. The tailsitter aircraft as recited in claim 1 wherein the attenuation cable comprises a mechanical fuse configured to detach the tow line from the airframe in response to the tow line tension exceeding a breakaway reaction threshold.

5. The tailsitter aircraft as recited in claim 4 wherein the mechanical fuse is configured to fracture in response to the tow line tension exceeding the breakaway reaction threshold.

6. The tailsitter aircraft as recited in claim 5 wherein the mechanical fuse comprises a shear pin.

7. The tailsitter aircraft as recited in claim 4 wherein the mechanical fuse comprises an electrically-actuated mechanical fuse; and wherein, the tow line tension reaction module comprises a tow line breakaway command module configured to send a release command to the electrically-actuated mechanical fuse in response to the tow line tension parameter exceeding the breakaway reaction threshold, the electrically-actuated mechanical fuse releasing the tow line from the airframe in response to receiving the release command.

8. The tailsitter aircraft as recited in claim 1 wherein the spool sensor comprises a spool position sensor to detect a position of the attenuation spool.

9. The tailsitter aircraft as recited in claim 8 wherein the spool sensor comprises a roller engaged with the attenuation spool to detect rotational movement of the attenuation spool.

10. The tailsitter aircraft as recited in claim 1 wherein the tow line tension reaction module comprises an aircraft speed command module to reduce a speed of the tailsitter aircraft in response to the tow line tension parameter exceeding a speed reaction threshold.

11. The tailsitter aircraft as recited in claim 1 wherein the tow line tension reaction module comprises an aircraft orientation command module to change a flight orientation of the tailsitter aircraft from the forward flight orientation to the VTOL orientation in response to the tow line tension parameter exceeding an orientation reaction threshold.

12. The tailsitter aircraft as recited in claim 1 wherein the tow line tension monitoring module comprises a tow line tension rate of change monitoring module to determine a tow line tension rate of change; and wherein, the tow line tension reaction module is configured to initiate the aircraft response based on the tow line tension rate of change.

\* \* \* \* \*